United States Patent [19]
Kyriakos

[11] Patent Number: 5,122,808
[45] Date of Patent: Jun. 16, 1992

[54] PHASE ONLY BEARING MEASURMENT WITH AMIGUITY CORRECTION IN A COLLISION AVOIDANCE SYSTEM

[75] Inventor: Constantinos S. Kyriakos, Boca Raton, Fla.

[73] Assignee: Allied-Signal Inc., Morris Township, N.J.

[21] Appl. No.: 590,209

[22] Filed: Sep. 28, 1990

[51] Int. Cl.$^5$ .............................................. G01S 5/04
[52] U.S. Cl. ................................... 342/442; 342/444; 342/434
[58] Field of Search ............... 342/442, 444, 445, 434, 342/386, 394

[56] References Cited
U.S. PATENT DOCUMENTS
4,780,772 10/1988 Cusdin ................................. 342/437

Primary Examiner—Gregory C. Issing
Attorney, Agent, or Firm—Robert P. Marley; Howard G. Massung; Robert A. Walsh

[57] ABSTRACT

A receiver system for measuring the bearing of a target having ambiguity correction. The receiver system includes a four element antenna array, three receivers and two phase detectors. The system further includes switching means for selectively connecting the antenna elements to the receivers and the receivers to the phase detectors to obtain two pairs of bearing components, from which the target bearing is computed.

12 Claims, 5 Drawing Sheets

PHASE ONLY BEARING MEASURMENT WITH AMIGUITY CORRECTION IN A COLLISION AVOIDANCE SYSTEM

BACKGROUND OF THE INVENTION

This invention relates to a direction finding antenna system. More specifically, it relates to a receiver system in a Traffic/Alert Collision Avoidance System (TCAS) which is particularly suited for determining the bearing of a target aircraft relative to a protected aircraft.

The TCAS equipment located aboard a protected aircraft periodically transmits interrogation signals which are received by transponders located aboard other aircraft, hereinafter referred to as target aircraft, in the vicinity of the protected aircraft. Mode S altitude reporting transponders are preferred so that TCAS capabilities can be fully exploited. In reply to the interrogation signals, the target aircraft's transponder transmits a response signal. The TCAS equipment aboard the protected aircraft determines the range of the target aircraft in accordance with the round trip time between transmission of the interrogation signal and receipt of the response signal. In addition, if the target aircraft is equipped with a Mode S transponder, the protected aircraft can determine the altitude of the target aircraft from the content of the response signal.

Information in the response signal, as well as information derived from the response signal, is used by the TCAS equipment to determine whether there is a threat of collision between the protected aircraft and the target aircraft. The response from each target aircraft is processed individually to determine the degree of threat and then, if necessary, an appropriate advisory is issued by the TCAS equipment to the pilot of the protected aircraft to minimize the degree of threat.

The target aircraft s bearing is usually derived from the response signal by a multi-element antenna array, for example, by a four element antenna array and an associated receiver system. In a conventional four element antenna array, there are two pairs of antenna elements. The elements are preferably spaced equally about the circumference of the antenna array, that is at 90° intervals. A first pair of elements, therefore, are aligned on an axis which is perpendicular to an axis on which the second pair of elements are aligned. Adjacent elements are those which are circumferentially spaced apart by 90°. Opposite elements are those which are circumferentially spaced apart by 180°.

Conventionally, the bearing of the target aircraft is determined by measuring the phase difference of the response signal between opposite element pairs. If both pairs of opposite elements are used, for example, then the phase difference between one opposite element pair is $K \sin(\beta)$ and the phase difference between the other opposite element pair is $K \cos(\beta)$, where K is the maximum phase excursion of the response signal between the elements in the respective opposite pair, and $\beta$ is the angle of target signal incidence with respect to the axes connecting antenna elements within an element pair, and $\beta$ is the angle of target signal incidence with respect to the axes connecting antenna elements within an element pair. The actual bearing is then calculated as follows:

$$\beta = \tan^{-1}(K \sin(\beta)/K \cos(\beta))$$

Such a system functions properly as long as K is less than 180°. When K is greater than or equal to 180°, however, an ambiguity exists as phase detectors in the receive system are unable to properly distinguish phase differences. In such cases, for example, the phase detector cannot differentiate between measured phase differences of 180° and −180°. Under these circumstances the bearing of the intruder aircraft, therefore, can not be determined with certainty. This ambiguity conflicts with a desire to utilize an antenna which has the greatest phase excursion between opposite elements in order to maximize the signal to noise ratio of the system.

Also, in a phase only measurement system, the phase error of the measurement means can not be ignored. For example, some of the receive system induced phase errors can not be corrected by factory calibration of system equipment since phase variations occur in the system components with varying temperature, age and other variables.

SUMMARY OF THE INVENTION

The apparatus of the present invention includes an antenna array having four circumferentially spaced elements, three receivers and two phase detectors and switching means. The switching means makes a first measurement by connecting the first antenna element to the first receiver's input, the second antenna element to the second receiver s input and the fourth element to the third receiver's input, the first receiver's output to a first input of the first and second phase detector, the second receiver's output to a second input of the first phase detector and the third receiver's output to a second input of the second phase detector. The switching means makes a second measurement by connecting the third element to the first receiver's input, the fourth element to the second receiver's input, the second element to the third receiver's input, the first receiver's output to the second input of the first and second phase detector, the second receiver's output to the first input of the first phase detector and the third receiver's output to the first input of the second phase detector. Means to determine the bearing of a target from one or both of the measurements are provided.

It is an object of the present invention to provide a phase only bearing measurement system having ambiguity correction.

It is a further object of the present invention to provide a bearing measurement system which permits usage of an array with opposite elements having a maximum phase excursion of greater than or equal to 180°.

It is another object of the present invention to provide a bearing measurement system having an improved signal to noise ratio.

DESCRIPTION OF THE PREFERRED EMBODIMENT

Figure 1:
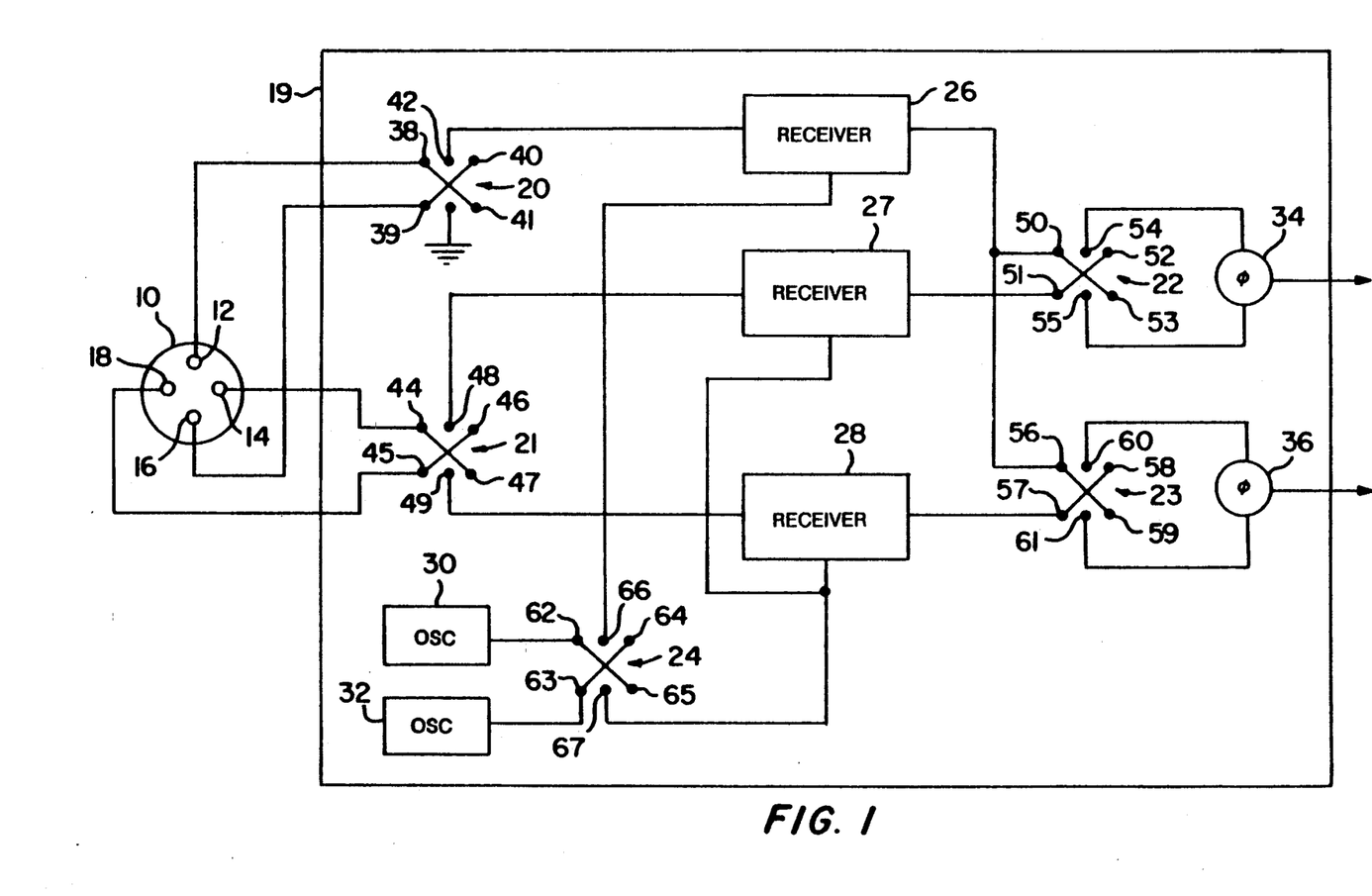
FIG. 1 illustrates a preferred receive system for making phase only bearing measurements in accordance with the present invention.

The present invention is a phase only measurement system particularly suited for use in an airborne collision avoidance system, such as TCAS. FIG. 1 illustrates a preferred receive system for making phase only bearing measurements in accordance with the present invention. A four element antenna array 10 is preferred for use in the TCAS equipment of a protected aircraft. Each of the elements 12, 14, 16 and 18 are arranged in quadrature, that is they are spaced apart at 90° around a circumference of the array 10. The elements 12 and 16 are aligned along the y axis and the elements 14 and 18 are arranged on the x axis which is perpendicular to the y axis. Adjacent elements are those which are circumferentially spaced apart by 90°. Opposite elements are those which are circumferentially spaced apart by 180°. When a response signal from a target aircraft impinges on the array 10, the bearing of the target aircraft is determined from the relative phases of the response signal at adjacent array elements.

Each of the elements 12, 14, 16 and 18 are connected to a receiver 19. The receiver 19 includes five swap switches 20 to 24, three receivers 26 to 28, two oscillators 30 and 32 and two phase detectors 34 and 36.

The swap switches 20 and 21 selectively interconnect the antenna elements 12, 14, 16 and 18 to a first input of the receivers 26 to 28. The swap switch 20 has six terminals 38 to 43. Two terminals 38 and 41 are connected to the antenna element 12 and two terminals 39 and 40 are connected to the antenna element 16. The output terminal 42 is connected to the first input of the receiver 26 and the output terminal 43 is preferably connected to ground. The swap switch 20 has two positions: Swap A and Swap B. In the Swap A position, the terminals 42 and 43 are connected to the terminals 38 and 39, respectively, such that the antenna element 12 is connected to the receiver 26 and the antenna element 16 is connected to ground. In the Swap B position, the terminals 42 and 43 are connected to the terminals 40 and 41, respectively, such that the antenna element 12 is connected to ground and the antenna element 16 is connected to the receiver 66.

The swap switch 21 similarly has six terminals 44 to 49. The antenna element 14 is connected to the two terminals 44 and 47. The antenna element 18 is connected to the two terminals 45 and 46. The output terminal 48 is connected to the first input of the receiver 27 and the output terminal 49 is connected to the first input of the receiver 28. The swap switch 21 also has a Swap A position and a Swap B position. In the Swap A position, the terminals 48 and 49 are connected to the terminals 44 and 45, respectively, such that the antenna element 14 is connected to the receiver 27 and the antenna element 18 is connected to the receiver 28. In the Swap B position, the terminals 48 and 49 are connected to the terminals 46 and 47, respectively, such that the antenna element 14 is connected to the receiver 28 and the antenna element 18 is connected to the receiver 27.

Each of the swap switches 20 and 21 are selectively controlled between the Swap A and the Swap B positions to exchange the signal paths between pairs of antenna elements and the input of pairs of receivers.

The swap switches 22 and 23 selectively interconnect the output of the receivers 26 to 28 to the inputs of the phase detectors 34 and 36. The swap switch 22 has six terminals 50 to 55. The output of the receiver 26 is connected to two terminals 50 and 53. The output of the receiver 27 is connected to two terminals 51 and 52. The output terminal 54 is connected to a first input of the phase detector 34 and the output terminal 55 is connected to a second input of the phase detector 34. In a Swap A position, the terminals 54 and 55 are connected to the terminals 50 and 51, respectively, such that the output of the receiver 26 is connected to the first input of the phase detector 34 and the output of the receiver 27 is connected to the second input of the phase detector 34. In a Swap B position, the terminals 54 and 55 are connected to the terminals 52 and 53, respectively, such that the output of the receiver 27 is connected to the first input of the phase detector 34 and the output of the receiver 26 is connected to the second input of the phase detector 34.

The swap switch 23 also has six terminals 56 to 61. The output of the receiver 26 is connected to the terminals 56 and 59. The output of the receiver 28 is connected to the terminals 57 and 58. The output terminal 60 is connected to a first input of the phase detector 36 and the output terminal 61 is connected to a second input of the phase detector 36. In a Swap A position, the terminals 60 and 61 are connected to the terminals 56 and 57, respectively, such that the output of the receiver 26 is connected to the first input of the phase detector 36 and the output of the receiver 28 is connected to the second input of the phase detector 36. In a Swap B position, the terminals 60 and 61 are connected to the terminals 58 and 59, respectively, such that the output of the receiver 26 is connected to the second input of the phase detector 36 and the output of the receiver 28 is connected to the first input of the phase detector 36.

Each of the swap switches 20 to 23 are simultaneously and selectively controlled between the Swap A and Swap B positions to exchange the signal paths between a receiver and the first and second inputs of a phase detector.

The swap switch 24 and the two oscillators 30 and 32 are preferably used to calibrate the phase detectors 34 and 36. The swap switch 24 has six terminals 62 to 67. The output of the oscillator 30 is connected to the terminals 62 and 65. The output of the oscillator 32 is connected to the terminals 63 and 64. The terminal 66 is connected to a second input in the receiver 26 and the terminal 67 is connected to a second input in the two receivers 27 and 28. The second input in each of the receivers 26 to 28 preferably bypass any front end filtering which the receivers 26 to 28 might have, thereby avoiding phase shifted signals. As before, the swap switch 24 has a Swap A position in a Swap B position. In the Swap A position, the terminals 66 and 67 are connected to the terminals 62 and 63, respectively, such that the oscillator 30 is connected to the second input of the first receiver 26 and the second oscillator 32 is connected to the second inputs of the two receivers 27 and 28. In the Swap B position, the terminals 66 and 67 are connected to the terminals 64 and 65, respectively, such that the first oscillator 30 is connected to the second inputs of the two receivers 27 and 28 while the second oscillator 32 is connected to the second input of the first receiver 26.

The outputs of the phase detectors 34 and 36 provide sine and cosine components of the target aircraft bearing when the response signal transmitted by the target aircraft impinges the antenna array 10. It is, however, preferred to calibrate the system before taking phase detection measurements to determine the bearing of a receive signal. Calibration is preferably divided into two parts. First, the phase detectors 34 and 36 are calibrated for a given pair of the receivers 26 to 28. Second, the three receivers 26 to 28 and the cabling associated therewith are calibrated.

The calibration of the phase detectors 34 and 36 for a given pair of the receivers 26 to 28 will now be discussed with reference to FIGS. 2 and 3. The phase detector 34 is associated with the receiver pair 26 and 27. The phase detector 36 is associated with the receiver pair 27 and 28. The calibration of the phase detectors 34 and 36 for the respective pair of receivers is preferably performed in two steps. Generally, in the first step, the system is configured such that, for a given phase detector, a first signal is input through a first receiver to a first input of the phase detector and a second signal is input through a second receiver to a second input of the phase detector. Then, in the second step, the signal input to the receivers and the receiver connection to the inputs of the phase detector is swapped, such that the first signal is input through the second receiver to the first input of the phase detector and the second signal is input through the first receiver to the second input of the phase detector. The first and second signals have differing frequencies which are not multiples of each other. The first and second signals, therefore, cannot become synchronized. These steps provide a linear phase sweep of the phase detectors to characterize the behavior of the phase detectors.

Figure 2:
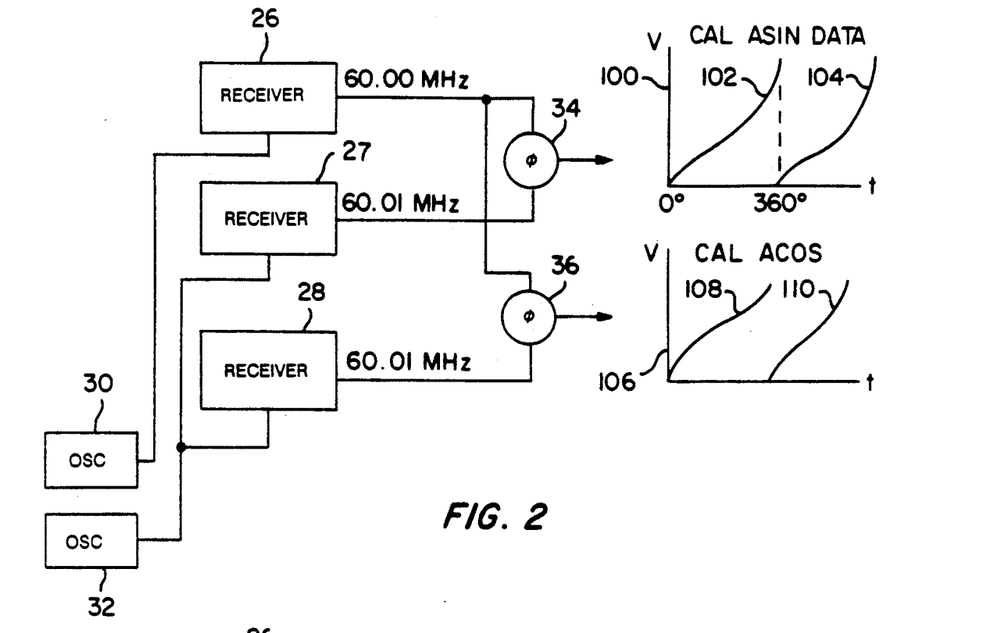
FIGS. 2 and 3 illustrate the signal paths during a preferred phase detector calibration procedure.

FIG. 2 illustrates the signal paths during the first step of the phase detector calibration procedure. The signal paths are obtained by placing the swap switches 22 to 24 (not shown) in the Swap A position.

The oscillators 30 and 32 generate the first and second signals before mentioned. The oscillators 30 and 32 preferably are highly stable in frequency and differ in frequency by a very small percentage. For example, in a TCAS receiver it is preferred to have the oscillator 30 output a frequency of 60.00 MHz and to have the oscillator 32 output a frequency of 60.01 MHz. Other frequencies, however, can be used.

Referring to FIG. 2, in the first step of the phase detector calibration procedure the 60.00 MHz signal from the oscillator 30 passes through the receiver 26 to the first inputs of the phase detectors 34 and 36. The 60.01 MHz signal from the oscillator 32 passes through the receivers 27 and 28 to the second input of the phase detectors 34 and 36, respectively. Each of the phase detectors, therefore, has 60.00 MHz at its first input and 60.01 MHz at its second input.

The voltage output of the phase detector 34 is monitored by an analog to digital converter as the 60.00 MHz and the 60.01 MHz signals are input and a set of data, CALASIN, is obtained. This data is graphically illustrated in a graph 100. A first line 102 and a second line 104 in the graph 100 represents the voltage output of the phase detector 34. The first line 102 is caused by the first cycles of the 60.00 MHz signal and the 60.01 MHz signal and, therefore, represents the phase detector 34 output over approximately 360° of the input signal. The second line 104 is caused by the second cycles of the 60.00 MHz signal and the 60.01 MHz signal. It is preferred to sample more than one cycle of data from the output of the phase detector 34 as it is possible that the line 102 does not start at 0° since the oscillators 30 and 32 and the phase detector 34 operate asynchronously.

A second set of calibration data, CALACOS, is obtained by sampling the output of the phase detector 36 as the signals from the oscillators 30 and 32 are input. This data is represented on the graph 106 by the lines 108 and 110. Again, it is preferred to sample two cycles of data, however, more or less cycles can be sampled as necessary.

Figure 3:
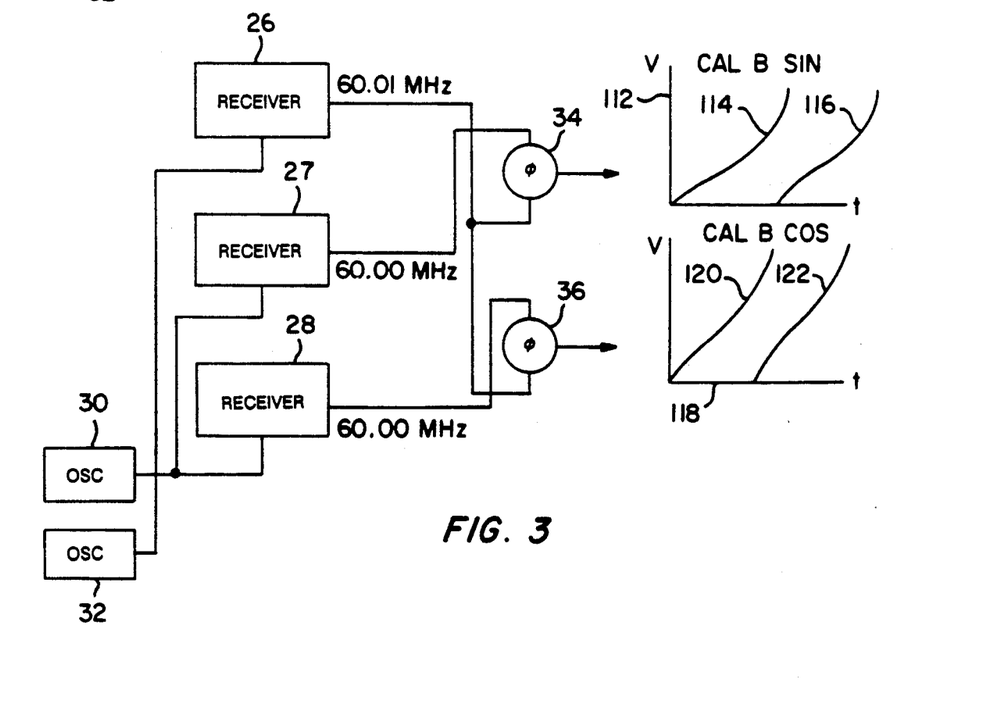

Referring to FIG. 3, the signal paths for the second step in the preferred phase detector calibration Procedure is illustrated. These signal paths are obtained by placing the swap switches 22 to 24 in the Swap B position. Note that the signal inputs to the receivers 26 to 28 are swapped and receiver connections to each phase detector 34 and 36 are swapped between receiver pairs. As a result, the 60.01 MHz signal from the oscillator 32 passes through the receiver 26 to the second input of the phase detectors 34 and 36. Also, the 60.00 MHz signal from the oscillator 30 passes through the receiver 27 and 28 to the first input of the phase detectors 34 and 36, respectively. Two more sets of calibration data, CALBSIN and CALBCOS, represented on the graphs 112 and 118, respectively, by the lines 114, 116 and 120, 122, respectively, are obtained by monitoring the outputs of the phase detectors 34 and 36, respectively.

Figure 4:
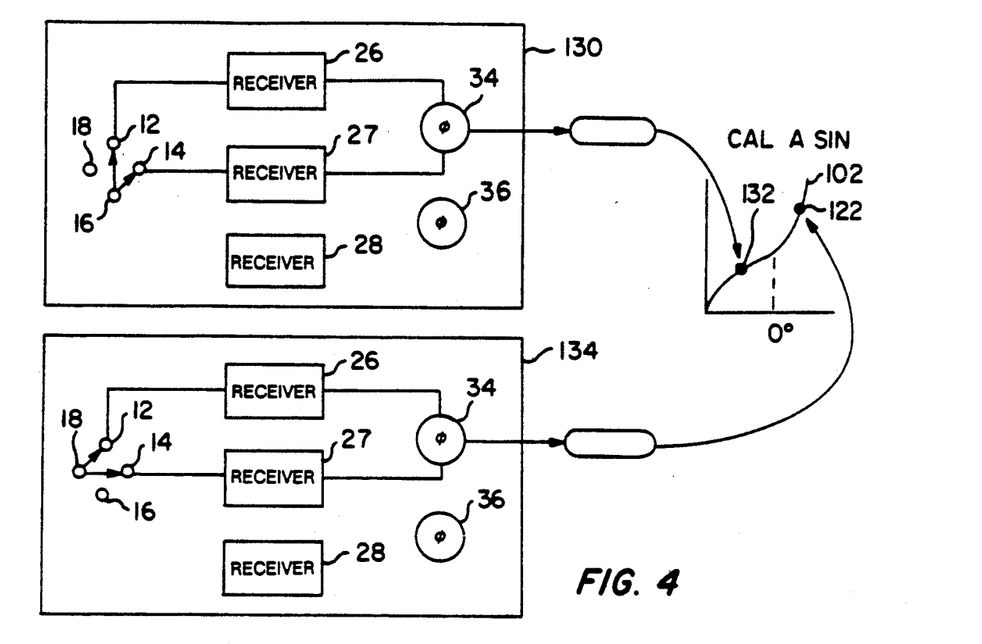
FIGS. 4 through 7 illustrate the signal paths during a preferred receiver calibration procedure.

After obtaining the four sets of phase detector calibration data, the second calibration step is performed, wherein the receivers 26 to 28 and the associated cables, are calibrated. The preferred calibration procedure for the receivers 26 to 28 is illustrated in FIGS. 4 to 7. In FIG. 4, two receiver calibration measurements are illustrated. For both of these steps, the swap switches 20 to 23 are in the Swap A position.

The first measurement is taken with the receive system configured to have signal paths as illustrated within the box 130. In this measurement, a signal at the frequency of the response signal is transmitted from the element 16. In aircraft collision avoidance systems, for example, the response signal is preferably transmitted at a frequency of 1090 MHz, and a similar frequency would be used to calibrate. The transmitted signal is received by the element 12, transmitted through the receiver 26 to the first input of the phase detector 34. The transmitted signal is also received by the antenna element 14, transmitted through the receiver 27 to the second input of the phase detector 34. The output of the phase detector 34 is monitored and the value is plotted on the curve 102 as a data point 132.

The second measurement is taken with the receive system configured to have signal paths as illustrated within the box 134. In this measurement, a signal is transmitted from the antenna element 18. The signal is received by the antenna elements 12 and 14 and transmitted through the receivers 26 and 27, respectively, to the first and second inputs, respectively, of the phase detector 34. The output of the phase detector 34 is monitored and is plotted on the curve 102 as a data point 136. The average 0° measurement through the receiver pair 26 and 27 is then determined to be the mid point along the curve 102 between the points 132 and 136. In finding the zero point between adjacent elements, offsets caused by the antenna, the cabling and the receivers are canceled.

Figure 5:
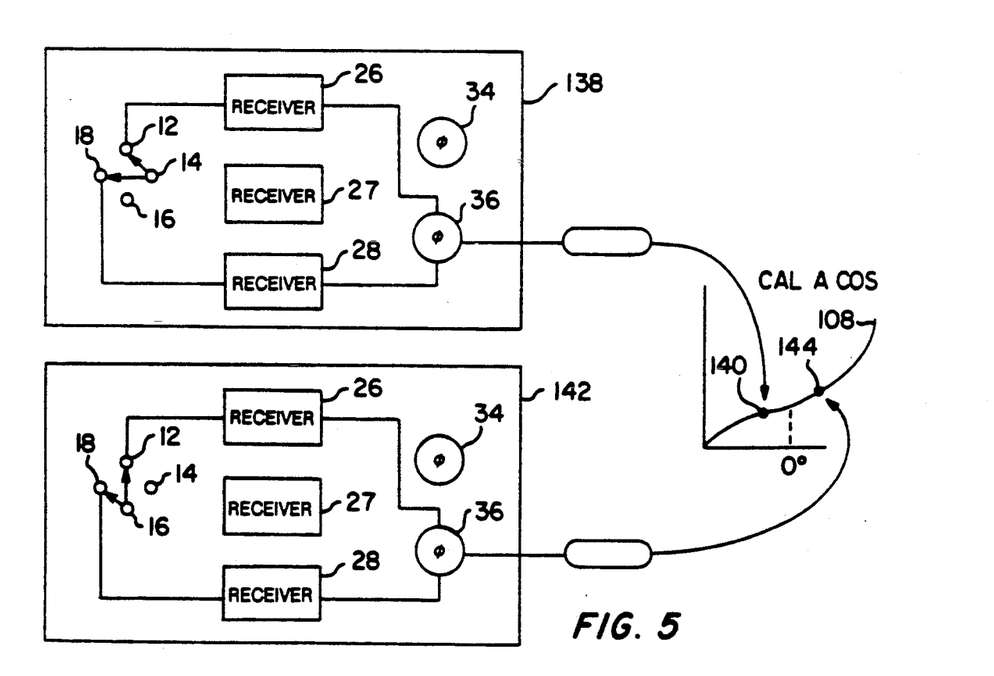

FIG. 5 illustrates the next two measurements that are taken. The swap switches 20 to 23 are again set in the Swap A position. In the third measurement, a signal is transmitted from the antenna element 14 and the signal paths that result are illustrated in the box 138. The transmitted signal is received by the antenna elements 12 and 18. The signal received by the antenna element 12 is passed through the receiver 26 to the first input of the phase detector 36. The signal received by the antenna element 18 is passed through the receiver 28 to the second input of the phase detector 36. The output of the phase detector 36 is measured and is plotted as a data point 140 on the curve 108.

In the fourth measurement, the element 16 transmits a signal and the signal paths that result are illustrated in the box 142. The transmitted signal is received by the antenna elements 12 and 18. The received signals are passed to the second phase detector 36 along the same signal paths as in the third measurement. The output of the phase detector 36 is monitored and is plotted as a data point 142 on the curve 108.

Figure 6:
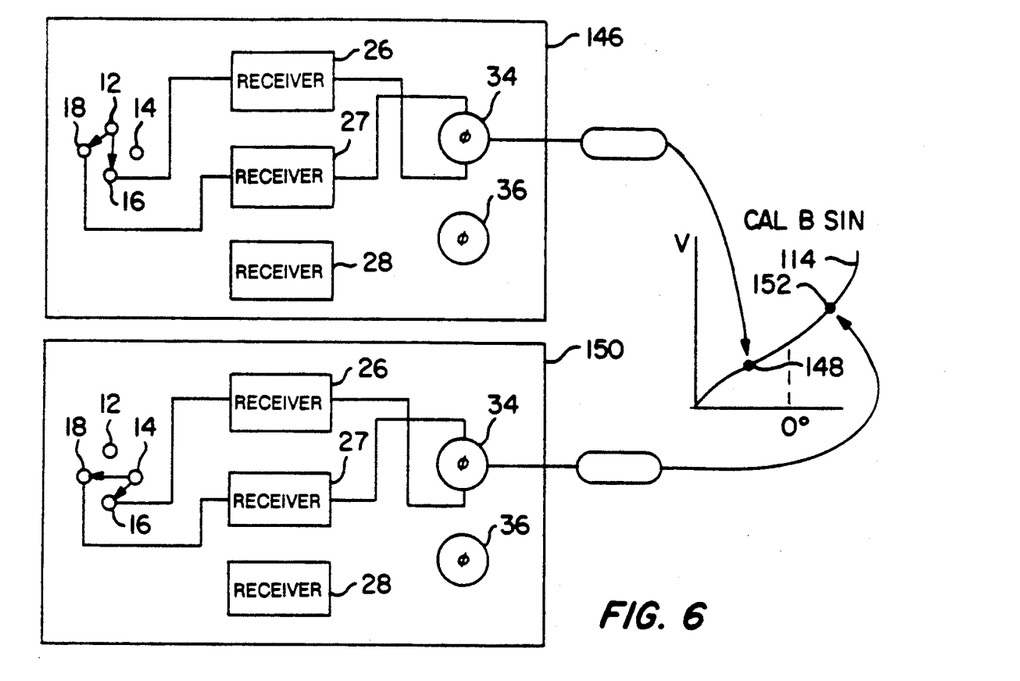

The next two measurements are taken with the swap switches 20 to 23 in the Swap B position. In the fifth measurement, a signal is transmitted from the antenna element 12. The resulting signal paths are illustrated in the box 146. The transmitted signal is received by the antenna elements 16 and 18. The signal received by the antenna element 16 is passed through the receiver 26 to the second input of the phase detector 34. The signal received by the antenna element 18 is passed through the receiver 27 to the first input of the phase detector 34. The output of the phase detector 34 is monitored and is plotted as a data point 148 on the curve 114.

For the sixth measurement, a signal is transmitted from the antenna element 14. The resulting signal paths are illustrated in the box 150. The signals are received again by the antenna elements 16 and 18. These signals are passed to the inputs of the phase detector 34 along the same signal paths as in the fifth measurement. The output of the phase detector 34 is monitored and is plotted as a data point 152 on the curve 114.

Figure 7:
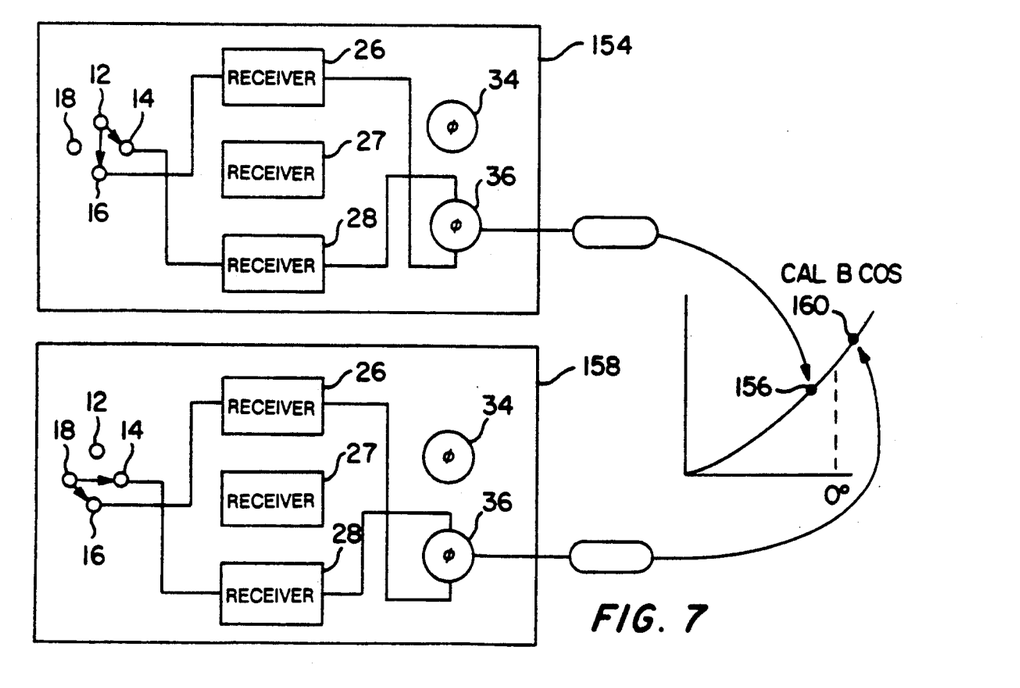

The next two measurements are again made with the swap switches in the Swap B position. A signal is transmitted from the antenna element 12. The resulting signal paths are illustrated in the box 154. The transmitted signal is received by the antenna elements 14 and 16. The antenna element 16 receives the signal and transmits it through the receiver 26 to the second input of the phase detector 36. The signal received by the antenna element 14 is transmitted through the receiver 28 to the first input of the phase detector 36. The output of the phase detector 36 is monitored and plotted as a data point 156 on the curve 120.

For the eighth measurement, a signal is transmitted from the antenna element 18. The signal paths are shown in the box 158. The output of the phase detector 36 is monitored and plotted as a data point 160 on the curve 120.

As previously discussed, the outputs of the phase detectors 34 and 36 provide sinc and cosine components of the bearing of the target aircraft. It is preferred to take two measurements, a first with swap switches 20 to 23 in the Swap A position and a second with the swap switches 20 to 23 in the Swap B position.

Figure 8:
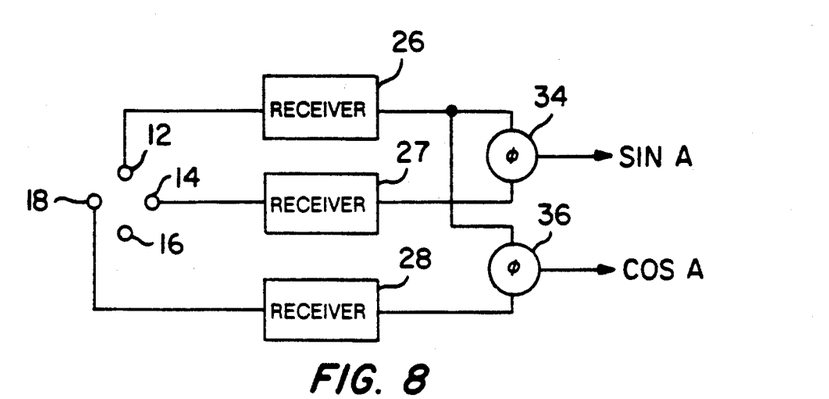
FIGS. 8 and 9 illustrate the signal paths during a preferred bearing measurement procedure.

FIG. 8 illustrates the signal paths from the antenna element through the receiver to the phase detector when the first measurement is taken (i.e. with the swap switches in the Swap A position). The output from the phase detector 34, therefore, is a first component, SINA, of the bearing of the target aircraft note that SINA results from the phase difference between the antenna elements 12 and 14. The output from the phase detector 36 is a second component, COS A, of the bearing of the target aircraft note that COSA results from the phase difference of the response signal as measured between the elements 12 and 18. The antenna element 16 is preferably grounded during this measurement.

Figure 9:
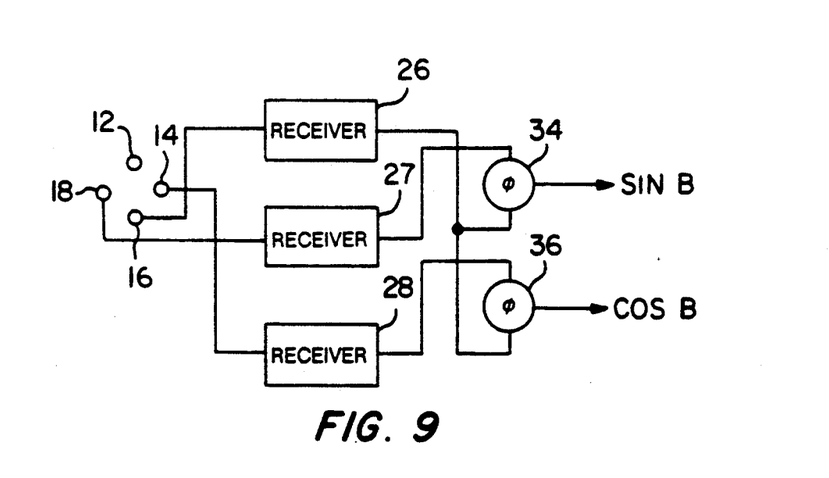

FIG. 9 illustrates the signal paths from the antenna elements through the receivers to the phase detector when the second measurement is taken, (i.e. with the swap switches 20 to 23 in the Swap B position. The signal from the antenna element 12 is input to the first inputs of the phase detectors 34 and 36 through the receiver 26. The signal from the antenna element 14 is input to the second input of the phase detector 34 through the receiver 27 and the signal from the antenna element 18 is input to the second input of the phase detector 36. The output from the phase detector 34, therefore, is a first component SIN B, of the bearing of the target aircraft. Note that SIN B results from the phase difference between the antenna elements 16 and 18. The output from the phase detector 36, is a second component, COS B, of the bearing of the target aircraft. Note that COS B results from the phase difference between the antenna elements 14 and 16.

After all the results—SIN A, COS A, SIN B AND COS B—are obtained from each measurement, the results from each phase detector 34 and 36 is, preferably, averaged as follows:

$$AVG\ SIN = (SIN\ A + SIN\ B)/2$$

$$AVG\ COS = (COS\ A + COS\ B)/2$$

Then the bearing of the target is determined as follows:

$$BEARING = \tan^{-1}(AVG\ SIN/AVG\ COS) + 45°$$

Note that 45° must be added to the result since adjacent antenna elements are used to calculate bearing instead of opposite antenna elements.

The above-described bearing calculation requires that the antenna array 10 receive the response signal from a target aircraft during both the Swap A and the Swap B procedures. In other words valid replies are required during the first and second bearing measurements. It is possible, however, for a reply to be missing during either the Swap A or the Swap B procedures. Consider, for example, possibility of interference causing the target aircraft's response signal not to be received at the protected aircraft's TCAS antenna at the appropriate time.

In cases where the reply from one of the Swap procedures (A or B) is missing, it is preferred to use the following procedure. For each Swap A and Swap B measurement, the following error equations are determined:

$$SINERR = (SIN\ A - SIN\ B)/2$$

$$COSERR = (COS\ A - COS\ B)/2$$

These equations are updated each time a valid Swap A and a valid Swap B measurement are both obtained. If the replies obtained during a Swap A measurement, SIN A and COS A, are missing, then bearing is determined by the following equation:

$$BEARING = \tan^{-1}((SIN\ B + SINERR)/(COS\ B + COSERR)) + 45°$$

Where the replies from a Swap B measurement are missing, then bearing is determined by the following equation:

$$\text{BEARING} = \tan^{-1}((\text{SIN } A + \text{SINERR})/(\text{COS } A + \text{COSERR})) + 45°$$

In the above equations, the most current values of SINERR and COSERR are used. In this way, some measures of the errors in the receive system are accounted for in the bearing determination. The above "A only" and "B only" measurements provide a rough bearing with 3 db less S/N ratio and less accuracy. Further, the antenna characteristics are not completely averaged out. Receiver phase errors due to received signal frequency differences (i.e. different from the 1090 MHz calibration signal), and, to a lesser extent, amplitude, are not canceled out with "A only" or "B only" measurements.

I claim:

1. Apparatus for measuring bearing of a target from a signal transmitted by the target, comprising:

an antenna array having a first, a second, a third and a fourth element, each of said antenna elements being circumferentially spaced;

a first, a second and a third receiver, each of said receivers having an input and an output;

a first and second phase detector, each having a first input, a second input and an output;

first switching means for making a first measurement by connecting said first element to said input of said first receiver, said second element to said input of said second receiver, said fourth element to said input of said third receiver, said output of said first receiver to said first input of said first and said second phase detectors, said output of said second receiver to said second input of said first phase detector and said output of said third receiver to said second input of said second phase detector and for making a second measurement by connecting said third element to said input of said first receiver, said fourth element to said input of said second receiver and said second element to said input of said third receiver, said output of said first receiver to said second input of said first and said second phase detector, said output of said second receiver to said first input of said first phase detector, and said output of said third receiver to said first input of said second phase detector; and means for determining target bearing from said first and second measurements.

2. Apparatus as claimed in claim 1, wherein said antenna elements are circumferentially spaced by 90 degrees.

3. Apparatus as claimed in claim 1, wherein said switching means grounds any unused antenna elements.

4. Apparatus as claimed in claim 3, wherein said third antenna element is grounded during said first measurement and said first antenna element is grounded during said second measurement.

5. Apparatus as claimed in claim 2, wherein said first and second measurements each generate a first component related to the sine of target bearing and a second component related to the cosine of target bearing.

6. Apparatus as claimed in claim 5, wherein said first component equals K sin $\beta$ and said second component equals K cos $\beta$, where K is the maximum phase difference between oppositely spaced antenna elements, and $\beta$ is the angle of target signal incidence with respect to the axes connecting oppositely spaced antenna elements.

7. Apparatus as claimed in claim 6, wherein target bearing is determined by averaging the arc tangent of K sin $\beta$/K cos $\beta$.

8. Apparatus as claimed in claim 1, wherein target bearing is determined from one of said two measurements.

9. Apparatus as claimed in claim 1, whereby the phase offsets induced by differing physical and electrical characteristics of each antenna element and each receiver are averaged out.

10. Apparatus as claimed in claim 1, further comprising:

a first oscillator having a first frequency at an output;

a second oscillator having a second frequency at an output;

second switching means for connecting said output from said first oscillator to a second input of said first receiver and for connecting said output of said second oscillator to a second input of said second and third receivers in a first position and for interconnecting said output from said first oscillator to said second input of said second and third receivers and for connecting said output of said second oscillator to said second input of said first receiver in a second position;

wherein a first set of output data for said first and second phase detectors is determined with said second switching means in said first position and a second set of data is determined for said first and second phase detectors with said second switching means in said second position.

11. Apparatus as claimed in claim 10, further comprising transmitter means selectively connectable to each of said antenna elements for transmitting a signal therefrom;

wherein said first switching means is positioned for making said first measurement so that a first and second point in a first set of data for said first phase detector is determined by transmitting from said third and fourth element, respectively, and so that a first and second point in said first set of data for said second phase detector is determined by transmitting from said second element and said third element, respectively;

wherein said first switching means is then positioned for making said second measurement so that a first and second point in a second set of data for said first phase detector is determined by transmitting form said first element and from said second element, respectively, and so that a first and second point in said second set of data for said second phase detector is determined by transmitting from said first and from said fourth element, respectively;

wherein a zero point for each set of data for each phase detector is determined by averaging said first and said second points.

12. Apparatus as claimed in claim 11, wherein said bearing is calculated using said zero points.

* * * * *